United States Patent
Lacy et al.

(10) Patent No.: US 7,522,659 B2
(45) Date of Patent: Apr. 21, 2009

(54) UNIVERSAL SERIAL BUS (USB) 2.0 LEGACY FULL SPEED AND LOW SPEED (FS/LS) MODE DRIVER

(75) Inventors: Cameron Lacy, Milton (CA); Dino A. Toffolon, Stoney Creek (CA); Scott Howe, Campbellville (CA)

(73) Assignee: Synopsys, Inc., Mountain View, CA (US)

( * ) Notice: Subject to any disclaimer, the term of this patent is extended or adjusted under 35 U.S.C. 154(b) by 659 days.

(21) Appl. No.: 11/230,421

(22) Filed: Sep. 19, 2005

(65) Prior Publication Data
US 2007/0064778 A1 Mar. 22, 2007

(51) Int. Cl.
*H04B 1/38* (2006.01)
(52) U.S. Cl. .......................... 375/219; 326/83; 327/108
(58) Field of Classification Search ................ 375/219; 326/83; 327/108
See application file for complete search history.

(56) References Cited

U.S. PATENT DOCUMENTS

| | | | | |
|---|---|---|---|---|
| 4,329,728 | A * | 5/1982 | Welzhofer | 361/91.2 |
| 5,872,473 | A * | 2/1999 | Williams | 327/108 |
| 6,236,239 | B1 * | 5/2001 | Kogushi | 326/88 |
| 6,578,156 | B1 * | 6/2003 | Sugita | 713/502 |
| 6,615,301 | B1 * | 9/2003 | Lee et al. | 710/106 |
| 6,922,077 | B2 * | 7/2005 | Chandler et al. | 326/30 |
| 2003/0122617 | A1 * | 7/2003 | Johnston | 330/85 |
| 2005/0110517 | A1 * | 5/2005 | Chandler et al. | 326/30 |
| 2005/0122146 | A1 * | 6/2005 | Lin | 327/170 |

OTHER PUBLICATIONS

Jun Xiong, "A novel transmitter in high-speed serial data communication", Proceedings. 5th International Conference on ASIC, 2003 vol. 1, Oct. 21-24, 2003 pp. 627-630 vol. 1.*

* cited by examiner

*Primary Examiner*—Juan A Torres
(74) *Attorney, Agent, or Firm*—Bever, Hoffman & Harms, LLP; Jeanette S. Harms

(57) ABSTRACT

A Universal Serial Bus (USB) 2.0 transceiver includes a legacy full speed and low speed (FS/LS) USB driver that includes multiple output stages. The multiple output stages are connected in parallel to an output terminal. By sequentially providing the USB data to the multiple output stages, the USB signal at the output terminal will transition between logic states in an incremental fashion as the multiple output stages sequentially switch their individual output states. Consequently, the rise/fall time for the legacy FS/LS USB driver is controlled not by the strength of the inverter transistors in the output stages, but rather by the number of stages and the time interval between application of the USB data to each stage. Therefore, by selecting an appropriate number of output stages and an appropriate timing interval, accurate control over full speed and low speed USB signal rise/fall times can be provided.

20 Claims, 3 Drawing Sheets

UNIVERSAL SERIAL BUS (USB) 2.0 LEGACY FULL SPEED AND LOW SPEED (FS/LS) MODE DRIVER

BACKGROUND OF THE INVENTION

1. Field of the Invention

The invention relates to the field of electronic circuits, and in particular, to an accurate full speed/low speed mode driver for a USB 2.0 transceiver.

2. Related Art

The Universal Serial Bus (USB) protocol is a popular communications protocol that enables communications between a wide range of modern electronic devices and computer peripherals (e.g., scanners, digital cameras, personal digital assistants, and digital music players). The present USB 2.0 specification ("Universal Serial Bus Specification", Revision 2.0, Apr. 27, 2000) defines three signaling levels that can be supported by USB-compliant devices. The three levels include a low-speed (LS) mode operating at 1.5 Mbps at 3.3 V, a full-speed (FS) mode operating at 12 Mbps at 3.3 V, and a high-speed (HS) mode that signals at 480 Mbps at 400 mV.

The USB 2.0 specification imposes rigid performance requirements on the legacy modes of operation (i.e., the LS and FS modes) to ensure compatibility with older FS/LS-only devices. Those performance requirements include specific rise/fall time durations and crossing voltages. For example, a legacy LS rise/fall time must be within the range of 75 to 300 ns, while a legacy FS rise/fall time must be within the range of 8 to 20 ns. In both legacy LS and FS modes, crossing voltage (i.e., the voltage at which the transitioning differential USB signals $D_P$ and $D_M$ intersect) must be between 1.3 V and 2.0 V.

Unfortunately, the high speeds at which modern semiconductor devices and circuits typically run can make it difficult to control the relatively long duration legacy FS and LS transitions. Not only must the rise and fall times be throttled down to relatively slow rates, but individual rise and fall times must be well controlled to ensure proper crossing voltage performance. In an effort to reduce output rise times, conventional FS/LS mode drivers in USB 2.0 transceivers generally include a large capacitor to reduce the output slew rates. For example, FIG. 1A shows a conventional legacy FS/LS USB driver 100A that includes a PMOS transistor P110, an NMOS transistor N120, an output resistor R130, and an output capacitor C140. PMOS transistor P110 and NMOS transistor N120 are connected in series between an upper supply voltage $V_{DD}$ and ground to form an inverter. Resistor R130 is connected between the junction of transistors P110 and N120 (i.e., the inverter output) and an output terminal 102, while output capacitor C140 is connected between output terminal 102 and ground.

When FS or LS USB data DATA_N is provided to an input terminal 101 at the gates of transistors P110 and N120 (i.e., at the inverter input), the signal is inverted and fed out to output terminal 102 through output resistor R130 to generate a USB output signal $D_P$ (in a substantially similar manner, a complementary driver (not shown) would produce complementary signal $D_M$ in response to complementary USB data DATA to form the other half of the complete differential USB signal). The presence of output capacitor C140 is intended to reduce the slew rate of output signal $D_P$ so that the FS/LS signal requirements of the USB 2.0 Specification can be met. Specifically, output capacitor C140 is sized to provide an RC time constant (in conjunction with output resistor R130) that limits the slew rate of output signal $D_P$ to an acceptable level (the size of output resistor R130 is defined by the USB 2.0 specification to be 45 ohms).

Unfortunately, output capacitor C140 presents a less-than-ideal solution to the problem of overly rapid rise/fall times and out of bounds crossing voltages. Specifically, the large capacitor required to provide sufficient output slew reduction undesirably increases the size and cost of USB 2.0 transceivers incorporating legacy FS/LS USB driver 100A. In addition, accurate control over the capacitance of output capacitor C140 can be difficult to achieve using conventional semiconductor manufacturing processes, which in turn can reduce the yield for USB 2.0 transceivers incorporating legacy FS/LS USB driver 100A.

To overcome some of the limitations associated with legacy FS/LS USB driver 100A, a Miller capacitor can be used in place of output capacitor C140. For example, FIG. 1B shows a legacy FS/LS USB driver 100B that is substantially similar to driver 100A shown in FIG. 1A, except that output capacitor C140 is replaced with a Miller capacitor C150. Miller capacitor C150 is connected between input terminal 101 and output terminal 102 of legacy FS/LS USB driver 100B. Due to this bridging of input terminal 101 and output terminal 102, Miller capacitor C150 exhibits the well-known "Miller Effect" that multiplies its effective capacitance as seen by output terminal 102. Therefore, the size requirements for Miller capacitor C150 can be reduced over those of output capacitor C140 shown in FIG. 1A, thereby allowing legacy FS/LS USB driver 100B to occupy less die area than legacy FS/LS USB driver 100A.

However, the use of Miller capacitor C150 still involves the use of a relatively space-inefficient capacitor (typically on the order of 140 μm×140 μm), and Miller capacitor C150 exhibits the same problematic capacitance variations associated with output capacitor C140 in FIG. 1A. Furthermore, the CMOS inverter used in conventional legacy FS/LS USB drivers (i.e., the inverter formed by transistors P110 and N120 in drivers 100A and 100B) can make accurate crossing voltage control difficult to achieve, even if the output or Miller capacitor provides sufficient output slew reduction. In particular, the pull-up strength of PMOS transistor P110 and the pull-down strength of NMOS transistor N120 can vary independently with process variations. For example, the pull-up strength and pull-down strength may exhibit a negative correlation (i.e., as the pull-up strength of PMOS transistor P110 increase, the pull-down strength of NMOS transistor N120 will decrease). Therefore, normal process variations will often result in inverters that slew much more rapidly in one direction, which in turn results in crossing voltages that are more likely to fall outside the specified 1.3 V to 2.0 V range.

Accordingly, it is desirable to provide a space-efficient and accurate legacy FS/LS USB driver for a USB 2.0 transceiver.

SUMMARY OF THE INVENTION

Conventional legacy full speed/low speed (FS/LS) drivers in USB 2.0 transceivers have difficulty meeting the FS/LS USB rise time and crossing voltage requirements defined by the USB 2.0 Specification. The capacitors used to reduce output slew rate consume excessive layout area and are a relatively coarse method of slew rate control, and the CMOS inverters used to generate the FS/LS signal tend to exhibit unequal pull-up and pull-down strengths, which in turn leads to out-of-spec crossing voltages. By implementing the legacy FS/LS USB driver in a USB 2.0 transceiver using multiple output stages in parallel, greater control over output signal rise times and crossing voltages can be achieved to enable consistent and accurate legacy FS/LS USB performance.

In one embodiment, a USB 2.0 apparatus (i.e., a USB transceiver circuit/IC or USB product) can include a legacy FS/LS USB driver that includes multiple output stages. Each output stage can include an inverter and an output resistor connected between the inverter and an output terminal. A data distribution circuit such as a shift register can then sequentially provide USB data to each of the multiple output stages, so that the output stages "switch" (i.e., change output state) in sequence. This "switching" simply involves supplying the output resistor in the driver output stage with the new supply voltage (i.e., connecting the output resistor to either upper supply voltage $V_{DD}$ (3.3 V) or lower supply voltage $V_{SS}$ (ground)). As the output stages switch output states, the USB signal at the output terminal incrementally increases or decreases until all the output resistors are connected to the same supply voltage. Therefore, the total rise/fall time exhibited by the legacy FS/LS USB driver is substantially related to the number of output stages multiplied by the time interval at which the USB data is provided to successive driver output stages.

In one embodiment, the shift register can be clocked by the 480 MHz clock that is required to generate the 480 Mbps high speed USB data transmissions. Because each clock tick (interval) of the 480 MHz clock is approximately 2 ns (2.083 ns), a new driver output stage will receive the new USB data approximately every 2 ns. Therefore, because full speed USB signals must exhibit rise/fall times in the 8 ns to 20 ns range, a legacy FS USB driver can include four to ten driver output stages when clocked by the high speed USB clock. Similarly, because low speed USB signals must exhibit rise/fall times in the 75 ns to 300 ns range, a legacy LS USB driver can include 38 to 150 driver output stages when clocked by the high speed USB clock. In one embodiment, a legacy FS/LS USB driver can include a clock divider to allow the same number of output stages to be used during both FS and LS generation (e.g., during LS signal generation, the clock divider divides the high speed USB clock by eight). In another embodiment, to minimize stair-stepping in the USB signal waveform during transitions between logic levels, each driver output stage can include slew-limiting elements, such as output or Miller capacitors, or low speed predriver circuitry.

The invention will be more fully understood in view of the following description and drawings.

DETAILED DESCRIPTION

Conventional legacy full speed/low speed (FS/LS) drivers in USB 2.0 transceivers have difficulty meeting the FS/LS USB rise time and crossing voltage requirements defined by the USB 2.0 Specification. The capacitors used to reduce output slew rate consume excessive layout area and are a relatively coarse method of slew rate control, and the CMOS inverters used to generate the FS/LS signal tend to exhibit unequal pull-up and pull-down strengths, which in turn leads to out-of-spec crossing voltages. By implementing the legacy FS/LS USB driver in a USB 2.0 transceiver using multiple output stages in parallel, greater control over output signal rise times and crossing voltages can be achieved to enable consistent and accurate legacy FS/LS USB performance.

Figure 2:
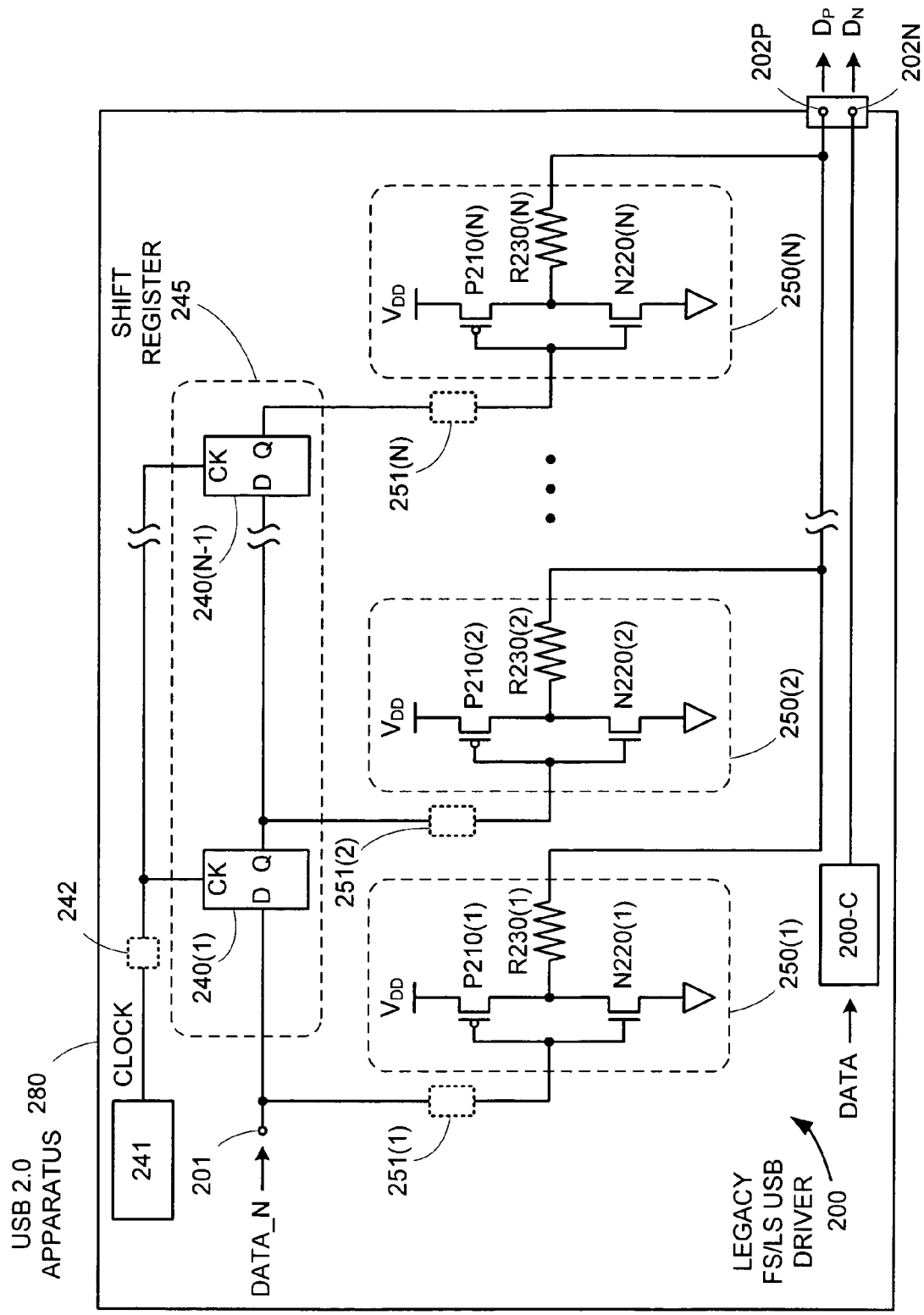
FIG. 2 is a legacy FS/LS USB driver circuit that incorporates multiple output stages.

FIG. 2 shows an exemplary USB 2.0 apparatus 280 that includes a legacy FS/LS USB driver 200. USB 2.0 apparatus 280 can represent a USB 2.0 transceiver (circuit or IC) or a USB 2.0 product (e.g., cell phone, digital camera, personal digital assistant (PDA), multimedia player, or computer peripheral). Legacy FS/LS USB driver 200 includes multiple output stages 250 (designated 250(1) through 250(N)). Each of the quantity N stages 250 includes a PMOS transistor P210 (designated P210(1) through P210(N)) and an NMOS transistor N220 (designated N220(1) through N220(N)) connected in series between a supply voltage $V_{DD}$ and ground (i.e., lower supply voltage $V_{ss}$) to form an inverter, and an output resistor R230 (designated R230(1) through R230(N)) coupled between the junction of transistors P210 and N220 (i.e., the inverter output) and a USB data terminal 202P. The individual outputs of output stages 250 therefore provide the total USB signal $D_P$ at output terminal 202P. Legacy FS/LS USB driver 200 also includes a complementary signal generator 200-C that includes output stages substantially similar to output stages 250 that are all connected to output terminal 202N. The output stages in complementary signal generator 200-C operate in a manner substantially similar to that described herein with respect to output stages 250 to generate a USB data signal $D_M$ from complementary USB data DATA (i.e., the complement of USB data DATA_N) at output terminal 202N. USB data signal $D_M$ is the complement of USB signal $D_P$, so that the total USB output signal provided by legacy FS/LS USB driver 200 is formed by the differential signals $D_P$ and $D_M$ (i.e., USB signals $D_P$ and $D_M$ each represent half of the full USB signal).

Legacy FS/LS USB driver 200 further includes a shift register 245 that includes a quantity (N−1) flip flops 240 (designated 240(1) through 240(N)) clocked by a common clock signal CLOCK and connected in series between an input terminal 201 and an input to the final output stage 250(N) (i.e., to the inverter input formed by the gates of transistors P210(N) and N220(N)). An input of the first output stage 250(1) (i.e., the inverter input formed by the gates of transistors P210(1) and N220(1)) is connected to input terminal 201, and each subsequent output stage 250 (designated 251(1) through 251(N)) is coupled to receive as an input the output of a corresponding flip flop 240 in shift register 245. Thus, the second output stage 250(2) receives as an input (at the inverter input formed by the gates of transistors P210(2) and N220(2)) the output of the first flip flop 240(1). Likewise, the third output stage 250 receives the output of the second flip flop 240, the fourth output stage 250 receives the output of the third flip flop 240, and so on until the Nth (last) output stage 250(N) receives the output of the (N−1)th flip flop 240(N−1). Note that in one embodiment, predriver circuits 251 may be included between each flip flop 240 and output stage 250 to facilitate the driving of the relatively large transistors in each output stage 250. Note further that in another embodiment, complementary signal generator 200-C may include a shift register that is substantially similar to shift register 245. In yet another embodiment, the output stages within complementary signal generator 200-C may be coupled to receive the (inverted) flip flop outputs from shift register 245.

In this manner, shift register 245 (in conjunction with input terminal 201) acts as a USB data distribution circuit that sequentially provides a legacy FS/LS data signal DATA_N to each of output stages 250. Each output stage 250 provides a portion of the total USB output signal DP, so that as each output stage 250 receives data signal DATA_N from shift register 245, USB output signal $D_P$ is incrementally adjusted towards the appropriate signal level (i.e., either 0 V or 3.3 V, nominally). Therefore, the rise/fall time exhibited by legacy FS/LS USB driver 200 is substantially determined by the number N of output stages 250 and by the timing of clock signal CLOCK. So long as the transition time for each output stage 250 is relatively short (i.e., the time constant determined by the resistance R230 in each output stage 250 multiplied by the capacitive load is much shorter than the total desired time step), legacy FS/LS USB driver 200 can meet the rise/fall time (and crossover voltage) requirements of the USB 2.0 Specification by selecting an appropriate number of output stages 250 and by providing an appropriate clock signal CLOCK.

Note that the number of output stages 250 influences the values of output resistors R230 in each output stage 250. The total (parallel) resistance provided by output resistors R230 must be equal to 45 ohms to meet the requirements of the USB 2.0 Specification. In one embodiment, resistors R230 can all have the same resistance (e.g., for five output stages 250, each output resistor R230 can have a resistance of 225 ohms, since five 225 ohm resistors in parallel are equivalent to a single 45 ohm resistor). In various other embodiments, output resistors R230 can exhibit different resistances (for example, output resistor R230(1) in first output stage 250(1) can have a larger resistance than output resistor R230(N) in last output stage 250(N) to create an output USB signal $D_P$ that slews more rapidly at the beginning of a transition than at the end of the transition).

A stable, high speed clock generator 241 is required to produce clock signal CLOCK for controlling the data propagation through shift register 245. In one embodiment, clock generator 241 can be the 480 MHz clock used for high speed USB 2.0 data transmissions. A 480 MHz clock provides a clock tick approximately every 2 ns (a 480 MHz clock actually provides clock ticks at 2.083 ns intervals, but for simplicity, subsequent discussion will use the substantially equivalent 2 ns). Therefore, to meet the legacy FS rise/fall time range of 8 to 20 ns, legacy FS/LS USB driver 200 can be implemented with five output stages 250 (and shift register 245 can be implemented with four flip flops 240), thereby providing an expected rise/fall time of 10 ns (i.e., five output stages 250 times 2 ns for shifting the data to each successive output stage 250). Note that in other embodiments, legacy FS/LS USB driver 200 could be implemented with four to ten output stages 250 and still meet the rise/fall specification when clocked by the 480 MHz high speed clock.

Figure 3:
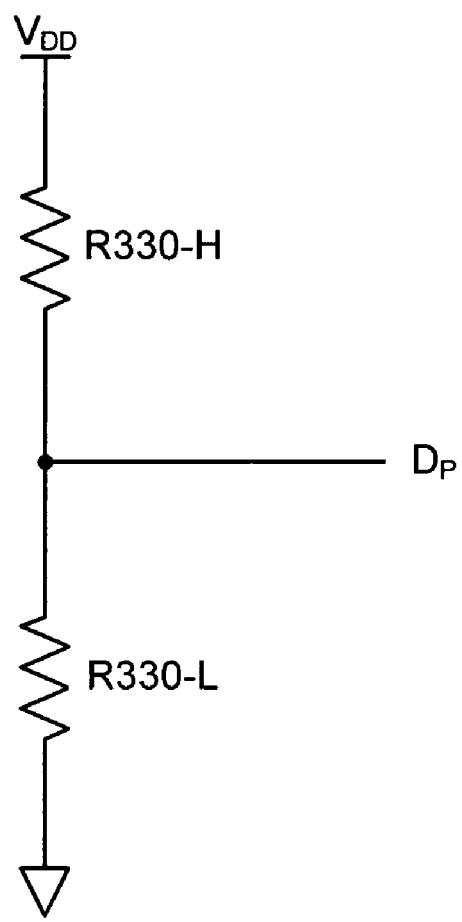
FIG. 3 is a representative circuit for the output impedance of the legacy FS/LS USB driver circuit of FIG. 2.

For explanatory purposes, FIG. 3 shows a circuit 300 that is representative of the output impedance for legacy FS/LS USB driver 200 shown in FIG. 2. Circuit 300 includes resistors R330-H and R330-L connected in series between upper supply voltage $V_{DD}$ and ground. USB signal $D_P$ is provided at the junction between resistors R330-H and R330-L. Resistor R330-H represents the total resistance provided by all output resistors R230 (shown in FIG. 2) in output stages 250 that are providing a logic HIGH (i.e., upper supply voltage $V_{DD}$) output signal. Likewise, resistor R330-L represents the total resistance provided by all output resistor R230 in output stages 250 that are providing a logic LOW (i.e., ground) output signal. Thus, when USB signal $D_P$ in a non-transition state (i.e., at either a logic HIGH state or a logic LOW state), one of resistors R330-H and R330-L has a resistance of 45 ohm while the other has an essentially infinite resistance. For example, when USB signal $D_P$ is at a logic HIGH state, resistor R330-H (which can be designated the "logic HIGH resistor") is at 45 ohm and resistor R330-L (the "logic LOW resistor") is an infinite resistance. When USB signal $D_P$ is in a logic LOW state, the resistances are reversed.

However, while USB signal $D_P$ is transitioning from one logic state to the other, the resistance values of resistors R330-H and R330-L change as output stages 250 sequentially switch between logic states. Specifically, as each output stage 250 receives the latest data signal value (DATA_N) from shift register 245, the output of that output stage 250 switches, which represents an increase in resistance for one of resistors R330-H and R330-L and a resistance decrease for the other of resistors R330-H and R330-L.

For example, if USB signal $D_P$ is originally at a logic HIGH state (i.e., $D_P=V_{DD}$), all output resistors R230 will be initially connected between supply voltage $V_{DD}$ and output terminal 202P, which corresponds to a 45 ohm resistance value for resistor R330-H (and an essentially infinite resistance for resistor R330-L). If data signal DATA_N then switches to the opposite state, the new data value is immediately provided to first output stage 250(1), which switches to a logic LOW output in response. Therefore, at this point, output resistor R230(1) in first output stage 250(1) is connected to ground (so that output resistor R230(1) corresponds to "logic LOW" resistor R330-L), while the output resistors R230 in all the other output stages remain connected to upper supply voltage $V_{DD}$ (so that those remaining output resistors R230 in parallel correspond to "logic HIGH" resistor R330-H). The value of USB signal $D_P$ provided at output terminal 202P then becomes a function of the voltage divider formed by resistors R330-L and R330-H, respectively, in FIG. 3. As the output resistors R230 in additional output stages 250 are sequentially switched from supply voltage $V_{DD}$ to ground, the ratio of "logic HIGH" resistor R330-H to "logic LOW" resistor R330-L continues to decrease, thereby causing USB signal $D_P$ to decrease as well, until all output resistors R230 are connected to ground and USB signal $D_P$ is pulled fully to ground.

This switching behavior for a legacy FS/LS USB driver having five output stages 250 (having equal output resistors R230) is compiled in Table 1, below. The state of the output resistor R230 in each of the five output stages 250 (designated 250(1) through 250(5)) is provided at each 2 ns clock tick as USB signal $D_P$ transitions from a logic HIGH level ($V_{DD}$=3.3 V) to a logic LOW level (ground=0 V). Any output stage 250 that connects its output resistor R230 to ground is marked with an "X".

Initially (at a starting time of 0 ns), all output stages 250(1) through 250(5) connect their output resistors R230 to supply voltage $V_{DD}$. Therefore, the total "logic HIGH" resistance R330-H is equal to 45 ohm, while the total "logic LOW" resistance R330-L is essentially infinite, and the full supply voltage $V_{DD}$ (3.3 V) is provided as USB signal DP. However, at a first clock tick at 2 ns, the new FS/LS data value (DATA_N) is provided to the first output stage 250(1), thereby causing output stage 250(1) to connect its output resistor R230(1) to ground (as indicated by the "X" in the "2 ns" column). As a result, the "logic HIGH" resistance R330-H is increased to 56.25 ohm (four 225 ohm resistors connected in parallel between supply voltage $V_{DD}$ and output terminal 202P), while the "logic LOW" resistance R330-L is decreased to 225 ohm (a single 225 ohm resistor connected between ground and output terminal 202P). The resulting voltage divider (56.25 ohms in series with 225 ohms) causes USB signal $D_P$ to drop to 2.6 V, as indicated in Table 1.

Then, at a second clock tick at 4 ns, the new FS/LS data value is provided to the second output stage 250(2), which causes second output stage 250(2) to connect its output resistor R230(2) to ground, as indicated in the "4 ns" column of Table 1. This further increases the "logic HIGH" resistance R330-H to 75 ohm (three 225 ohm resistors connected in parallel between supply voltage $V_{DD}$ and output terminal 202P) while decreasing the "logic LOW" resistance R330-L to 112.5 ohm (two 225 ohm resistors connected in parallel between ground and output terminal 202P). This new voltage divider (75 ohms in series with 112.5 ohms) drops USB signal $D_P$ down to 2.0 V.

At each subsequent clock tick, one more output stage 250 switches the connection of its output resistor R230 from supply voltage $V_{DD}$ to ground, thereby reducing the value of USB signal $D_P$ until all output resistors R230 are connected in parallel between ground and output terminal 202P and USB signal $D_P$ is at the desired 0 V. Thus, after 10 ns, the transition of USB signal $D_P$ from 3.3 V to 0 V is completed. By peris equal to the output impedance of the driver 200 multiplied by the expected capacitive load. The USB 2.0 Specification provides a nominal FS characterization load of 50 pF (with a maximum allowable capacitance of 150 pF), a 50-150 pF upstream facing port load for LS mode, and a 200-600 pF downstream facing port load for LS mode. Because FS/LS USB driver 200 provides a total (AC) output impedance that remains constant at 45 ohms, each step of the transition as stages 250 are switched can be well-controlled to fall within the required timeframe for accurate overall transition time control.

TABLE 1

| Output Stage | 0 ns | 2 ns | 4 ns | 6 ns | 8 ns | 10 ns |
| --- | --- | --- | --- | --- | --- | --- |
| 250(1) |  | X | X | X | X | X |
| 250(2) |  |  | X | X | X | X |
| 250(3) |  |  |  | X | X | X |
| 250(4) |  |  |  |  | X | X |
| 250(5) |  |  |  |  |  | X |
| R330-H | 45 Ω | 56.25 Ω | 75 Ω | 112.5 Ω | 225 Ω | ∞ |
| R330-L | ∞ | 225 Ω | 112.5 Ω | 75 Ω | 56.25 Ω | 45 Ω |
| $D_P$ | 3.3 V | 2.6 V | 2.0 V | 1.3 V | 0.66 V | 0 V | forming this transition in 2 ns "steps", the overall fall time for the transition can be accurately controlled. A substantially similar process can be used to accurately control the rise time for USB signal $D_P$ during the transition from 0 V to 3.3 V. Specifically, the output resistors R230 in output stages 250(1)-250(5) can be sequentially re-connected back to supply voltage $V_{DD}$ (from ground). In this manner, the multi-stage output of legacy FS/LS USB driver 200 ensures that the FS rise/fall time requirements are satisfied.

Similarly, to meet the rise/fall time requirements for legacy LS signals, legacy FS/LS USB driver 200 could include anywhere from 38 to 150 output stages 250, so that the 2 ns clock ticks of the high speed 480 MHz clock result in a rise/fall time in the specified range of 75 to 300 ns. In another embodiment, an optional clock divider 242 can be used to reduce the clock signal received by shift register 245 during legacy LS signal generation. For example, because an 8× relationship exists between the legacy LS (1.5 MHz) and FS (12 MHz) signal rates, clock divider 242 can be implemented as a simple divide-by-8 circuit to allow the same number of output stages 250 to be used for both legacy LS and legacy FS signal generation (with clock divider 242 being active only during LS signal generation). Just as described above, the output resistors R230 in the output stages 250 must provide a total parallel resistance equal to 45 ohm (although the output resistors R230 need not necessarily all have the same resistance).

Note that by providing well-defined rise/fall times, legacy FS/LS USB driver 200 also ensures that accurate crossing voltages can be achieved, since process variations will not disproportionately skew rise times and fall times. In fact, because the overall rise and fall times exhibited by legacy FS/LS USB driver 200 are a function of the number of output stages 250 and the timing of clock signal CLOCK, rather than being a function of PMOS and NMOS transistor strength, the effects of process variations on output characteristics can be rendered negligible.

Note also that precise control over total rise/fall times is dependent upon the output stages 250 exhibiting an RC time constant that is much less than the desired overall transition time. The RC time constant for legacy FS/LS USB driver 200

Figure 1A:
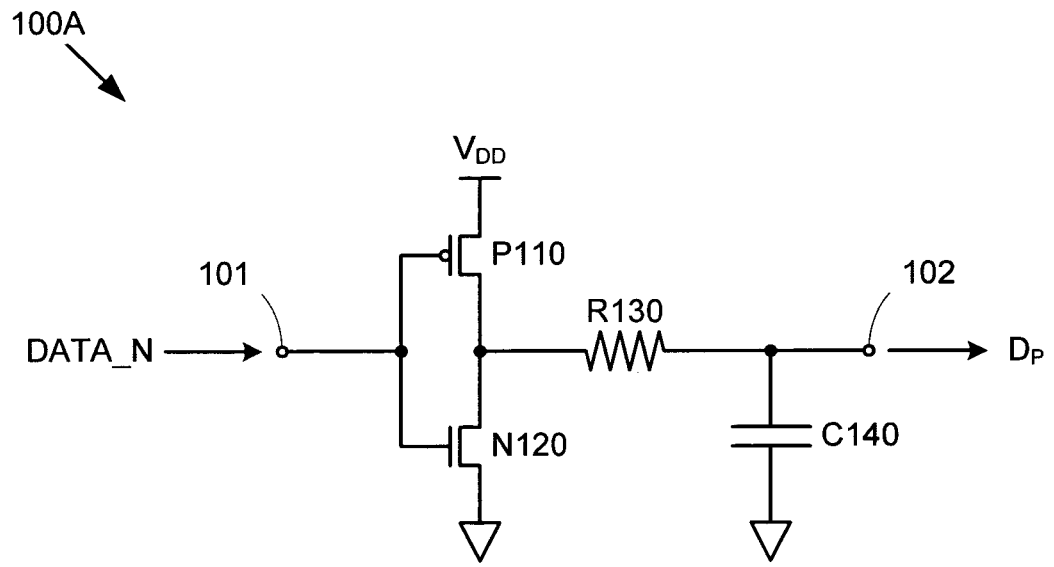
FIGS. 1A and 1B are conventional legacy FS/LS USB driver circuits.
Figure 1B:
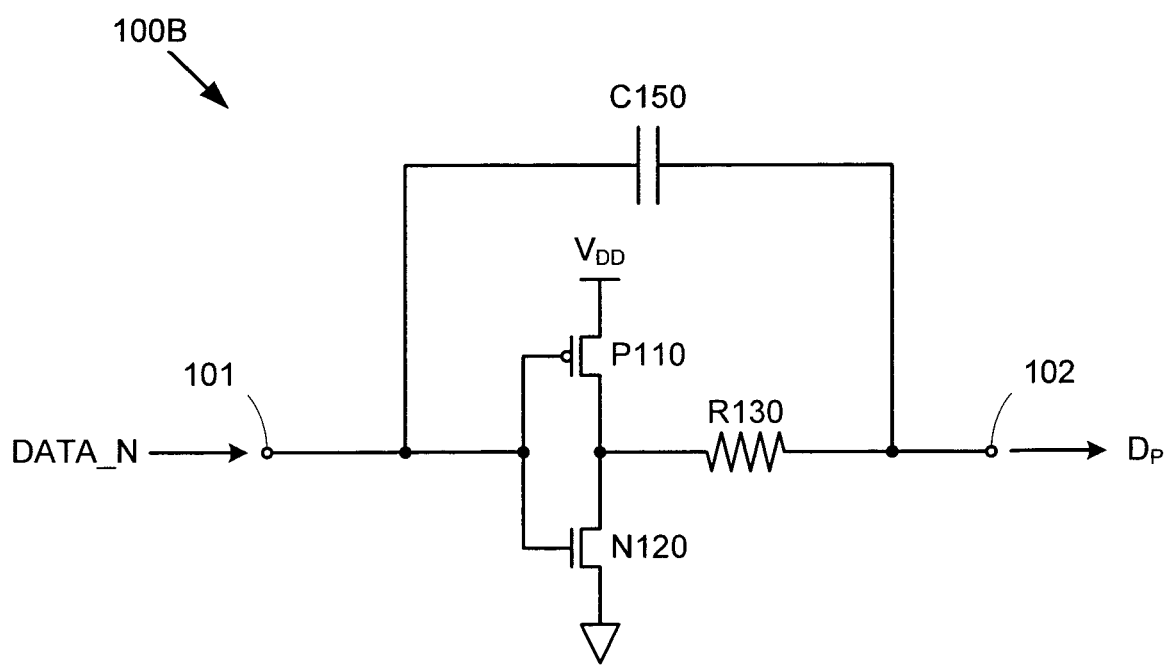

Note that because the slew rate of each output stage 250 will typically be significantly faster than the 2 ns interval between clock ticks, the actual output waveform generated by legacy FS/LS USB driver 200 will exhibit a "stepped" profile. While such a stepped profile will generally not introduce any USB communications issues, it may sometimes be desirable to provide a smoother output waveform. Therefore, in one embodiment, each output stage 250 may include a slew rate-limiting capacitor such as an output capacitor or Miller capacitor (as described with respect to FIGS. 1A and 1B, respectively) to reduce the individual output slews of output stages 250. Note that because any slew rate-limiting capacitors incorporated into output stages 250 would only be required to act on the individual stages 250 (rather than the entire output driver as in FIGS. 1A and 1B), the slew rate-limiting capacitors can be much smaller than those required in conventional output drivers (i.e., as in FIGS. 1A and 1B), thereby minimizing layout area requirements. In another embodiment, the pre-driver 251 for each output stage 250 could be configured to have a relatively low slew rate (e.g., by limiting the amount of current flow through each pre-driver 251), thereby limiting the output slew rate for each output stage 250. In another embodiment, the current through output stages 250 themselves could be limited to provide a similar reduction in slew rate. Various other "smoothing" techniques will be readily apparent.

The various embodiments of the structures and methods of this invention that are described above are illustrative only of the principles of this invention and are not intended to limit the scope of the invention to the particular embodiments described. Thus, the invention is limited only by the following claims and their equivalents.

The invention claimed is:

1. A Universal Serial Bus (USB) 2.0 transceiver comprising a legacy full speed and low speed (FS/LS) USB driver, the legacy FS/LS USB driver comprising:
   a first output terminal;
   a first plurality of driver output stages, each of the first plurality of driver output stages comprising a first pull-up PMOS transistor, a first pull-down NMOS transistor, and a first output resistor, a first terminal of the first output resistor being connected to the first output terminal and a second terminal being connected to shared terminals of the first pull-up PMOS transistor and the first pull-down NMOS transistor; and a first USB data distribution circuit for sequentially providing a USB data signal value to the first plurality of driver output stages, wherein each of the first plurality of driver output stages connects the second terminal of the first output resistor to a first supply voltage in response to the USB data signal value, wherein resistance values of the first plurality of driver output stages change as the first plurality of driver output stages sequentially switch between logic states, and wherein the first plurality of driver output stages provide a first predetermined, total parallel resistance as the first plurality of driver output stages sequentially switch between logic states.

2. The USB 2.0 transceiver of claim 1, wherein the first USB data distribution circuit comprises a shift register coupled to a USB data input terminal, wherein the USB data input terminal is coupled to a first one of the first plurality of driver output stages, wherein the shift register comprises a plurality of flip flops connected in series between the USB data input terminal and a last one of the first plurality of driver output stages, and wherein an output terminal of each of the plurality of flip flops is connected to one of the first plurality of driver output stages other than the first one of the first plurality of driver output stages.

3. The USB 2.0 transceiver of claim 2, wherein each of the plurality of flip flops is coupled to receive a clock signal from a 480 MHz clock.

4. The USB 2.0 transceiver of claim 3, wherein the first plurality of driver output stages consists of five driver output stages, and wherein the first output resistor in each of the first plurality of output stages has a resistance of 225 ohms.

5. The USB 2.0 transceiver of claim 4, further comprising a clock divider for reducing the clock signal by a factor of eight while the USB 2.0 transceiver is operating in LS mode.

6. The USB 2.0 transceiver of claim 2, further comprising a plurality of predriver circuits, each of the plurality of predriver circuits being connected between the output terminal of one of the plurality of flip flops and one of the first plurality of driver output stages.

7. The USB 2.0 transceiver of claim 1, wherein each of the first plurality of driver output stages comprises a capacitor connected to the first terminal of the output resistor.

8. The USB 2.0 transceiver of claim 1, further comprising:

a second output terminal; and a second plurality of driver output stages, each of the second plurality of driver output stages comprising a second pull-up PMOS transistor, a second pull-down NMOS transistor, and a second output resistor, a first terminal of the second output resistor being connected to the second output terminal and a second terminal being connected to shared terminals of the second pull-up PMOS transistor and the second pull-down NMOS transistor, wherein the first USB data distribution circuit sequentially provides the USB data signal value to the second plurality of driver output stages, wherein each of the second plurality of driver output stages connects the second terminal of the second output resistor to a second supply voltage in response to the USB data signal value, wherein resistance values of the second plurality of driver output stages change as the second plurality of driver output stages sequentially switch between logic states, and wherein the second plurality of driver output stages provide a second predetermined, total parallel resistance as the second plurality of driver output stages sequentially switch between logic states.

9. The USB 2.0 transceiver of claim 1, further comprising:

a second output terminal;

a second plurality of driver output stages, each of the second plurality of driver output stages comprising a second pull-up PMOS transistor, a second pull-down NMOS transistor, and a second output resistor, a first terminal of the second output resistor being connected to the second output terminal and a second terminal being connected to shared terminals of the second pull-up PMOS transistor and the second pull-down NMOS transistor; and a second USB data distribution circuit for sequentially providing the USB data signal value to the second plurality of driver output stages, and wherein each of the second plurality of driver output stages connects the second terminal of the second output resistor to a second supply voltage in response to the USB data signal value, wherein resistance values of the second plurality of driver output stages change as the second plurality of driver output stages sequentially switch between logic states, and wherein the second plurality of driver output stages provide a second predetermined, total parallel resistance as the second plurality of driver output stages sequentially switch between logic states.

10. The USB 2.0 transceiver of claim 1, wherein each of the first plurality of driver output stages comprises a slew rate-limiting capacitor.

11. A method for operating a Universal Serial Bus (USB) 2.0 device, the method comprising:

generating a first half of a USB signal, wherein generating the first half of a USB signal comprises sequentially providing a USB data value to a first plurality of driver output stages, each of the first plurality of driver output stages inverting the USB data value and providing a portion of the first half of the USB signal in response to the USB data value; and generating a second half of the USB signal, wherein the second half of the USB signal is a complement of the first half of the USB signal, and wherein generating the second half of the USB signal comprises sequentially providing the USB data value to a second plurality of driver output stages, each of the second plurality of driver output stages providing a portion of the second half of the USB signal in response to the USB data value, wherein generating each of the first and second halves of the USB signal including maintaining a predetermined, total parallel resistance as each of the first and second plurality of driver output stages sequentially switches between logic states.

12. The method of claim 11, wherein sequentially providing the USB data value to the first plurality of driver output stages comprises:

providing the USB data value to a first one of the first plurality of driver output stages at a first time;

waiting a predetermined time interval;
providing the USB data value to a next one of the first plurality of driver output stages; and
repeating the steps of waiting the predetermined time interval and providing the USB data value until the USB data value is provided to all of the first plurality of driver output stages.

13. The method of claim 12, wherein the predetermined time interval is defined by a 480 MHz clock,
wherein the first plurality of driver output stages consists of four to ten driver output stages,
wherein when the USB signal comprises a legacy full speed USB signal, the predetermined time interval is equal to a single clock tick of the 480 MHz clock, and
wherein when the USB signal comprises a legacy low speed USB signal, the predetermined time interval is equal to eight clock ticks of the 480 MHz clock.

14. A Universal Serial Bus (USB) 2.0 product comprising a legacy full speed and low speed (FS/LS) USB driver, the legacy FS/LS USB driver comprising:
a first output terminal;
a first plurality of driver output stages, each of the first plurality of driver output stages comprising a first pull-up PMOS transistor, a first pull-down NMOS transistor, and a first output resistor coupled between shared terminals of the first pull-up PMOS transistor and the first pull-down NMOS transistor and the first output terminal, the first pull-up PMOS transistor and the first pull-down NNOS transistor for selectably connecting the first output resistor to one of a first supply voltage and a second supply voltage; and
a first switching control means for sequentially providing a USB data signal to the first plurality of driver output stages and providing a first predetermined, total parallel resistance as the first plurality of driver output stages sequentially switch between logic states,
wherein the first pull-up PMOS transistor in each of the first plurality of driver output stages connects the first output resistor to a first supply voltage in response to a first value of the USB data signal, and
wherein the first pull-down PMOS transistor in each of the first plurality of driver output stages connects the first output resistor to a second supply voltage in response to a second value of the USB data signal.

15. The USB 2.0 product of claim 14,
wherein the first switching control means comprises a shift register.

16. The USB 2.0 product of claim 15, wherein the legacy FS/LS USB driver further comprises:
a second output terminal;
a second plurality of driver output stages, each of the second plurality of driver output stages comprising a second pull-up PMOS transistor, a second pull-down NMOS transistor, and a second output resistor coupled between shared terminals of the second pull-up PMOS transistor and second pull-down NMOS transistor and the second output terminal, the second second pull-up PMOS transistor and second pull-down NMOS transistor for selectably connecting the second output resistor to one of the first supply voltage and the second supply voltage; and
a second switching control means for sequentially providing the USB data signal to the second plurality of driver output stages,
wherein the second pull-down NMOS transistor in each of the second plurality of driver output stages connects the second output resistor to the second supply voltage in response to the first value of the USB data signal, and
wherein the second pull-up PMOS transistor in each of the second plurality of driver output stages connects the second output resistor to the first supply voltage in response to the second value of the USB data signal.

17. The USB 2.0 product of claim 16, wherein the first switching control means and the second switching control means comprise a single shift register.

18. The USB 2.0 product of claim 14, wherein the first switching control means sequentially provides the USB data signal to the first plurality of driver output stages at intervals defined by a 480 MHz clock,
wherein the first plurality of driver output stages consists of four to ten driver output stages,
wherein when the USB data signal comprises an FS signal, each of the intervals is equal to a single clock tick of the 480 MHz clock, and
wherein when the USB data signal comprises an LS signal, each of the intervals is equal to eight clock ticks of the 480 MHz clock.

19. The USB 2.0 product of claim 14, wherein the USB 2.0 product comprises one of a cell phone, a digital camera, a personal digital assistant (PDA), a multimedia player, and a computer peripheral.

20. The USB 2.0 product of claim 14, wherein each of the first plurality of driver output stages comprises one of an output capacitor and a Miller capacitor connected to the first output terminal.

* * * * *

UNITED STATES PATENT AND TRADEMARK OFFICE
CERTIFICATE OF CORRECTION

PATENT NO. : 7,522,659 B2  
APPLICATION NO. : 11/230421  
DATED : April 21, 2009  
INVENTOR(S) : Cameron Lacy et al.

Page 1 of 1

It is certified that error appears in the above-identified patent and that said Letters Patent is hereby corrected as shown below:

Column 11, line 30, claim 14, amend "NNOS" to -- NMOS --.

Column 12, line 10, claim 16, delete "second" (first occurrence).

Signed and Sealed this

Twenty-ninth Day of September, 2009

David J. Kappos
*Director of the United States Patent and Trademark Office*